United States Patent
Shigemori (10) Patent No.: US 7,693,309 B2
(45) Date of Patent: Apr. 6, 2010

(54) IMAGE PROCESSING METHOD, APPARATUS THEREFOR AND MEMORY MEDIUM STORING PROGRAM

(75) Inventor: Yuriyo Shigemori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 11/129,413

(22) Filed: May 16, 2005

(65) Prior Publication Data

US 2005/0207646 A1  Sep. 22, 2005

Related U.S. Application Data

(62) Division of application No. 09/572,588, filed on May 17, 2000, now Pat. No. 6,907,136.

(30) Foreign Application Priority Data

May 19, 1999  (JP) .................... 11-138535

(51) Int. Cl.
  *G06K 9/00* (2006.01)
(52) U.S. Cl. .................... 382/118
(58) Field of Classification Search .......... None
  See application file for complete search history.

(56) References Cited

U.S. PATENT DOCUMENTS

| | | | |
|---|---|---|---|
| 5,012,522 A | 4/1991 | Lambert | 382/118 |
| 5,459,586 A | 10/1995 | Nagasato et al. | 358/450 |
| 5,715,325 A | 2/1998 | Bang et al. | 382/118 |
| 5,781,665 A | 7/1998 | Cullen et al. | 382/254 |
| 5,859,921 A | 1/1999 | Suzuki | 382/118 |
| 5,923,788 A | 7/1999 | Rao | 382/275 |
| 5,960,126 A | 9/1999 | Nielsen et al. | 382/298 |
| 6,035,074 A | 3/2000 | Fujimoto et al. | 382/282 |
| 6,266,129 B1 | 7/2001 | Uzawa et al. | 355/40 |
| 6,389,155 B2 | 5/2002 | Funayama et al. | 382/118 |
| 6,526,161 B1 | 2/2003 | Yan | 382/118 |
| 6,654,506 B1 | 11/2003 | Luo et al. | 382/282 |

FOREIGN PATENT DOCUMENTS

JP  11-008814 A  1/1999

*Primary Examiner*—Vikkram Bali
*Assistant Examiner*—Elisa M Rice
(74) *Attorney, Agent, or Firm*—Fitzpatrick, Cella, Harper & Scinto (57) ABSTRACT

The invention intends, in preparing so-called ID photograph by cutting out an area from the image of a person, to obtain an appropriate area with simple operations. The method the invention comprises a designation step s201 of designating a rectangle circumscribed about a face area on an original image including a human face, an acquisition step s202 of acquiring the vertical length and the horizontal length of the rectangle designated by the designation step, and a determination step s203 of determining a cutout area including the face area, based on the vertical length and the horizontal length.

5 Claims, 10 Drawing Sheets

START
↓
S301: ACQUIRE INPUT IMAGE DATA DESIGNATION AREA DESIGNATED BY USER
(1) AREA RECTANGLE R1 : (LEFT, TOP)-(RIGHT, BOTTOM)
= (X11, Y11), (X12, Y12)

↓
S302: ACQUIRE DATA FROM OUTPUT IMAGE DATA TABLE
(2) REAL DIMENSIONS OF OUTPUT IMAGE : (w, h)

↓
S303: ACQUIRE EXPRESSIONS FOR CALCULATING NOTICEABLE AREA COORDINATE VALUES FOR OUTPUT IMAGE
PREMISE 1 : COORDINATE DISPLAY OF REAL DIMENSIONS OF (2) :
(LEFT, TOP)-(RIGHT, BOTTOM)=(0, h), (w, 0)
PREMISE 2 : NOTICEABLE AREA RECTANGLE R3 :
(LEFT, TOP)-(RIGHT, BOTTOM)
=(X21, Y21), (X22, Y22)

EXPRESSIONS
F1 : (Y22−Y21)=h×0.5
F2 : (Y22−Y21) : (X22−X21)=27 : 23
F3 : (X21+X22)/2=(w−0)/2
F4 : (Y22−Y21) : (Y21−0)=27 : 7

↓
S304: (3) CALCULATE COORDINATES (X21, X22, Y21, Y22) OF RECTANGLE R3 (=NOTICEABLE AREA RECTANGLE) SATISFYING EXPRESSIONS F1−F4

↓
S305: CALCULATE RECTANGLE SATISFYING THAT (1) CORRESPONDS TO (3) AND ITS CIRCUMFERENCE CORRESPONDS TO (2)
ACQUIRE INPUT/OUTPUT SIZE RATIO Dh FROM (1) AND (3)
Dh=(Y12−Y11)÷(Y22−Y21)
EACH COORDINATE VALUE OF CUTOUT AREA RECTANGLE Rt=(Xt1, Yt1)−(Xt2, Yt2) IS ACQUIRED BY CALCULATING FOLLOWING PROPORTIONAL EXPRESSIONS WITH USE OF (1), (2), (3) AND Dh
Xt1−X11 : X11−X12 : X12−Xt2=w−X21 : X21−X22 : X22
Yt1−Y11 : Y11−Y12 : Y12−Yt2=h−Y21 : Y21−Y22 : Y22
Xt1=X11+(w−X21)×Dh    Xt2=X12−X22×Dh
Yt1=Y11+(h−Y21)×Dh    Yt2=Y12−Y22×Dh

↓
S306: DISPLAY CUTOUT AREA
↓
PERFORM PRINTING
↓
END

ARBITRARY AREA ON
INPUT IMAGE DATA
(X11, Y11)–(X12, Y12) - - - (8-1)

CUTOUT IMAGE AREA
(CALCULATED VALUE)
(Xt1, Yt1)–(Xt2, Yt2) - - - (8-2)

IT OVERREACHES
ORIGINAL IMAGE

FIG. 8B

NOTICEABLE AREA ON
OUTPUT IMAGE DATA
(X21, Y21)–(X22, Y22)

REAL DIMENSIONS OF
OUTPUT IMAGE: (w, h)

FIG. 8C

CUTOUT IMAGE AREA OF
EXPRESSION (8-2) IS REDUCED
WITH ASPECT RATIO KEPT, SUCH
THAT CUTOUT IMAGE AREA OF
EXPRESSION (8-2) IS WITHIN
ORIGINAL IMAGE

CUTOUT IMAGE AREA
(REAL VALUE)
(Xt1', Yt1')–(Xt2', Yt2') - - - (8-3)

Xt2'−Xt2'=WIDTH OF ORIGINAL IMAGE

FIG. 8D

CUTOUT IMAGE BASED ON
EXPRESSION (8-3)

FIG. 10A (Xt1, Yt1)
(X11, Y11)
(X12, Y12)
(Xt2, Yt2)
Rt
R1

ARBITRARY AREA ON INPUT IMAGE DATA
(X11, Y11)–(X12, Y12) — (10-1)
CUTOUT IMAGE AREA (CALCULATED VALUE)
(Xt1, Yt1)–(Xt2, Yt2) — (10-2)
ENTIRE FACE CAN BE DISPLAYED BECAUSE OF UPRIGHT FACE

CUTOUT IMAGE BASED ON EXPRESSION (10-2)

FIG. 10B (Xt1, Yt1)
(X11, Y11)
(X12, Y12)
(Xt2, Yt2)
Rt
R1

ARBITRARY AREA ON INPUT IMAGE DATA
(X11, Y11)–(X12, Y12) — (10-1)
CUTOUT IMAGE AREA (CALCULATED VALUE)
(Xt1, Yt1)–(Xt2, Yt2) — (10-2)
FACE WITH EARS CUT IS DISPLAYED BECAUSE OF OBLONG FACE

CUTOUT IMAGE BASED ON EXPRESSION (10-2)

FIG. 10C (Xt1', Yt1')
(X11, Y11)
(X12, Y12)
(Xt2', Yt2')
Rt
R1

CUTOUT IMAGE AREA OF EXPRESSION (10-2) IS ENLARGED WITH ASPECT RATIO KEPT SUCH THAT CUTOUT IMAGE AREA OF EXPRESSION (10-2) HOLDS ENTIRE FACE
CUTOUT IMAGE AREA (REAL VALUE)
(Xt1', Yt1')–(Xt2', Yt2') — (10-3)
Xt1'–Xt2' = X11–X12

CUTOUT IMAGE BASED ON EXPRESSION (10-3)

IMAGE PROCESSING METHOD, APPARATUS THEREFOR AND MEMORY MEDIUM STORING PROGRAM

RELATED APPLICATION

This application is a divisional of application Ser. No. 09/572,588, filed May 17, 2000, the entire disclosure of which is hereby incorporated by reference.

BACKGROUND OF THE INVENTION

1. Field of the Invention

The present invention relates to an image processing apparatus for extracting a partial area from an original image.

2. Related Background Art

In the image processing apparatus, there is frequently utilized a function of cutting out a part of an input image and displaying such cutout image. For example, in a system for preparing a photograph for use in an ID card or the like, it is required to cut out a desired or noticeable area, including the face, from the image data of the object, according to the dimension and the face fitting position determined for each ID card and to display such cutout image. The technology for cutting out the noticeable area from the input image is disclosed for example in the Japanese Patent Application Laid-Open No. 11-8814.

The technology disclosed in the Japanese Patent Application Laid-Open No. 11-8814 is to point the top of the head and the chin with the mouse and to calculate the cutout area in such a manner that the external periphery of the cutout area matches the actual vertical and horizontal dimensions of the output image when the coordinates of the pointed two points become equal to the actual dimension between the two points designated for output.

However the contour of the human face has smooth irregularities, and it is not easy, for the unskilled user, to select the two points, namely the top of the head and the chin.

Also, while the output data define the length of face, the upper margin and the vertical and horizontal size of the photograph, the face is always centered within the width of the output image so that the freedom of arrangement is limited. Also in consideration of the ease of data preparation by the user, it is desirable to decrease the number of items to be designated for the output data.

SUMMARY OF THE INVENTION

In consideration of the foregoing, an object of the present invention is to resolve the above-mentioned drawbacks.

Another object of the present invention is to provide an image processing method comprising:

a designation step of designating a rectangle circumscribed about a face area on an original image including a human face;

an acquisition step of acquiring the vertical length and the horizontal length of the rectangle designated by the designation step; and a determination step of determining a cutout area including the face area, based on the vertical length and the horizontal length.

Still other objects of the present invention, and the features thereof, will become fully apparent from the following detailed description which is to be taken in conjunction with the accompanying drawings.

DETAILED DESCRIPTION OF THE PREFERRED EMBODIMENTS

First Embodiment

Hereinafter, the embodiments of the present invention will be explained in detail with reference to the accompanying drawings.

Figure 1:
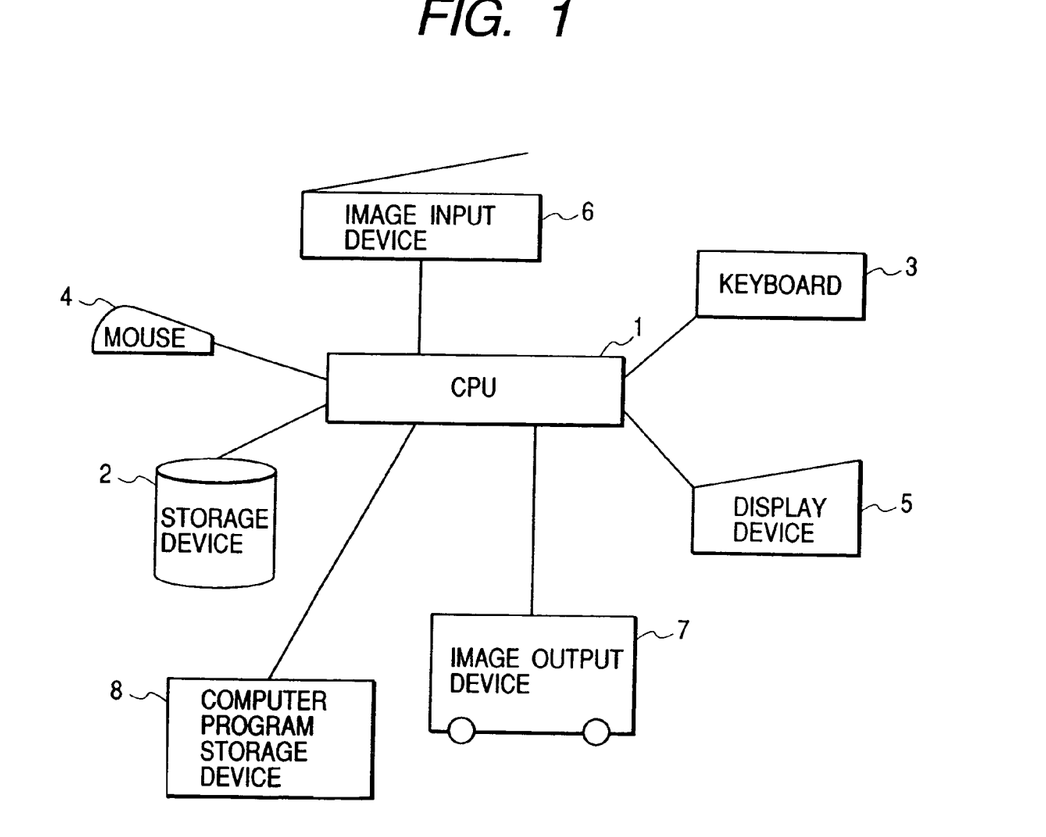
FIG. 1 is a block diagram showing hardware configuration of an image processing system embodying the present invention.

FIG. 1 is a block diagram showing the hardware configuration of an image processing system constituting the first embodiment of the present invention. The image processing system is principally composed of a central processing unit (CPU) 1, a storage device 2, a keyboard 3, a mouse 4, a display device 5, an image input device 6, an image output device 7, and a program storage device 8 storing a computer program used by the CPU 1 for executing the control sequence of the present embodiment.

As an example of the image processing system having the above-described configuration, there is conceived an ID photograph preparing system for entering an original image such as a portrait photograph from the image input device 6, acquiring a cutout area by the CPU 1 according to the rules for the ID photograph stored in the storage device 2, allowing the user to confirm the image on the display device 5 and to execute desired image processing on the image with the keyboard 3 or with the mouse 4, and printing the image with the image output device 7.

Figure 2:
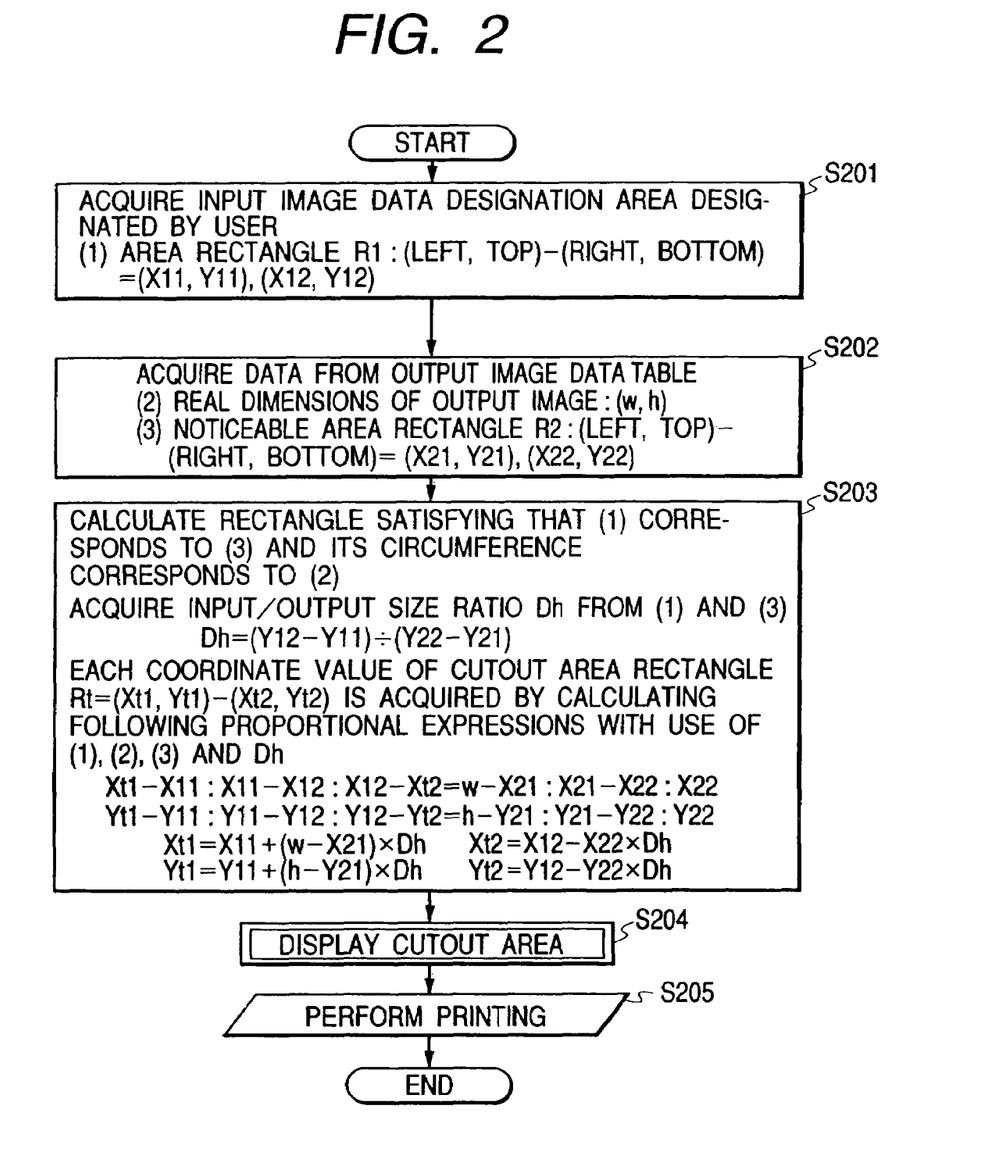
FIG. 2 is a flow chart showing an image processing method constituting a first embodiment.

FIG. 2 is a flow chart showing the image processing method constituting the first embodiment of the present invention.

In the following there will be explained the process sequence of the present embodiment with reference to FIG. 2.

The original image entered from the image input device 6 is often wider than the required ID photograph, so that the user is required select the necessary area within such input image. The principal component of such necessary area is the face of the object, and the position and size of the face are important factors of the ID photograph. Thus, after the input image to be used as the ID photograph is fixed, the CPU 1 issues a command for calculating the necessary area (cutout area), and, in response, there is initiated the process shown in FIG. 2 for acquiring the cutout area.

Figure 6:
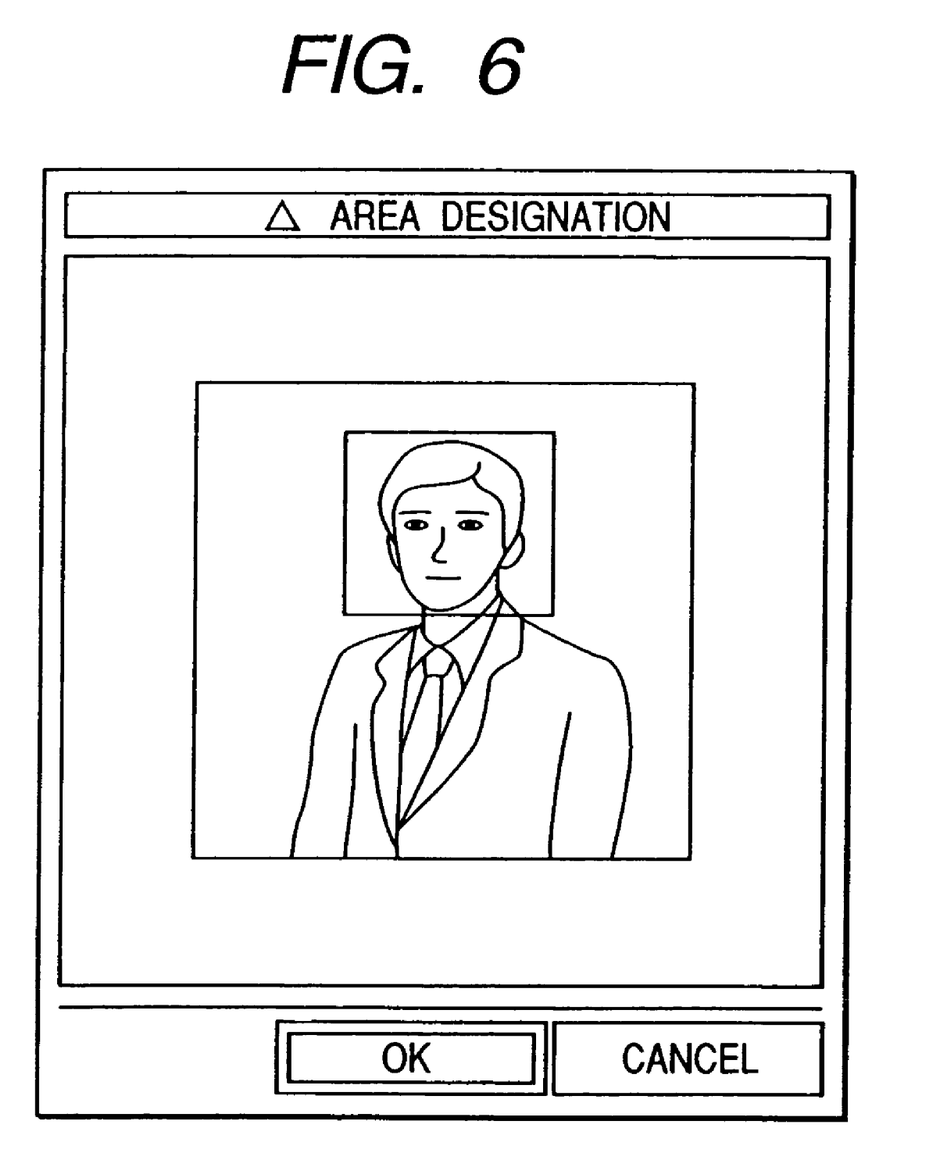
FIG. 6 is a view showing an example of a dialog box for designating the face area on the input image data.

In response to the start command for the cutout area discriminating process, the CPU 1 displays, on the display device 5, an operation image as shown in FIG. 6, in order to cause the use to designate the face area on the input image data. On the operation image shown in FIG. 6, there are displayed the input original image and a rectangular mark indicating the face area. The user moves the rectangle or changes the size thereof by a dragging operation with the mouse 4, so as to set a designated area in which the rectangular mark is circumscribed about the face. Upon completion of the setting operation, the user clicks a completion button with the mouse, and the CPU 1 awaits the completion to be informed.

Figure 5:
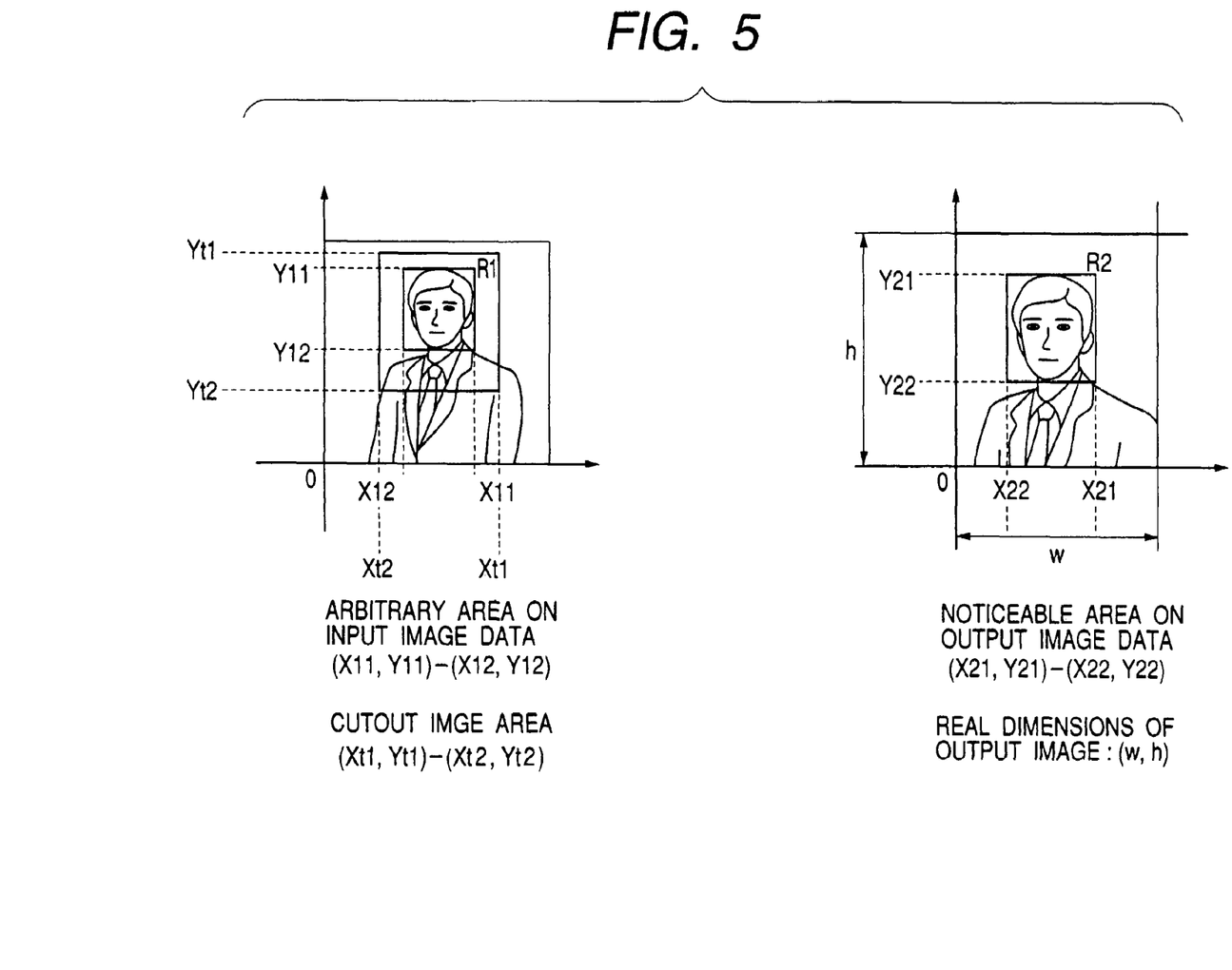
FIG. 5 is a view showing an example of the face area and the cutout image area in input object image data and in an output ID photograph image.

Upon receiving the information for the completion of the setting operation, the CPU 1 acquires coordinate information R1 of the face area rectangle (rectangle in the left-hand half in FIG. 5) set by the user on the input image data (step S201):

$$R1=(X11, Y11)-(X12, Y12)$$

Then the CPU 1 acquires, from a data table held in advance in the storage device 2, a real output dimension (w, h) of the ID photograph and coordinate information R2 of the noticeable rectangular area (rectangle in the right-hand half in FIG. 5), namely an area corresponding to the face area in such output, wherein:

$$R2=(X21, Y21)-(X22, Y22)$$

The CPU 1 determines, from R1 and R2, a size ratio D between the input image data and the actual output data of the ID photograph according to the following expression:

$$D=R1/R2$$

The size ratio may be determined preferentially from the height or width of the rectangular area, but the height information is used in the following calculations since the height information is more reliable for the face information desired in the ID photograph:

$$Dh=(Y12-Y11)/(Y22-Y21)$$

Following proportional expressions stand in the coordinate values of the left and right patterns in FIG. 5:

$$Xt1-X11:X11-X12:X12-Xt2=w-X21:X21-X22:X22$$

$$Yt1-Y11:Y11-Y12:Y12-Yt2=h-Y21:Y21-Y22:Y22$$

By substituting Dh in the foregoing proportional expressions, there can be calculated the cutout rectangular area Rt defined by (Xt1, Yt1), (Xt2, Yt2) (step S203):

$$Xt1=X11+(w-X21)\times Dh$$

$$Yt1=Y11+(h-Y21)\times Dh$$

$$Xt2=X12-X22\times Dh$$

$$Yt2=Y12-Y22\times Dh$$

The above mentioned value Rt defines the cutout area which is required in fitting the face area R1 (X11, Y11), (X12, Y12) of the input image data into the noticeable area R2 (X21, Y21), (X22, Y22) of the ID photograph of the real size (w, h). In this manner, from the designated area of the original image, there is acquired a cutout area different from such designated area. The CPU 1 displays such cutout area Tt on the display device 5 (step S204), and, after the confirmation by the user, causes the image output device 7 to print the cutout image (step S205). Through the above-described process, the present system can provide an ID photograph in which the face is positioned with a desired size in a desired face position.

The present embodiment achieves improvement in the operability that the concept of the necessary area in the ordinary life can be directly applied in designating the area on the input image data, and improvement in the process applicability that the arbitrary area designated by the operation means can be fitted in an arbitrary position by arbitrarily setting the coordinates of the noticeable area managed by the data table.

Second Embodiment

Figure 3:
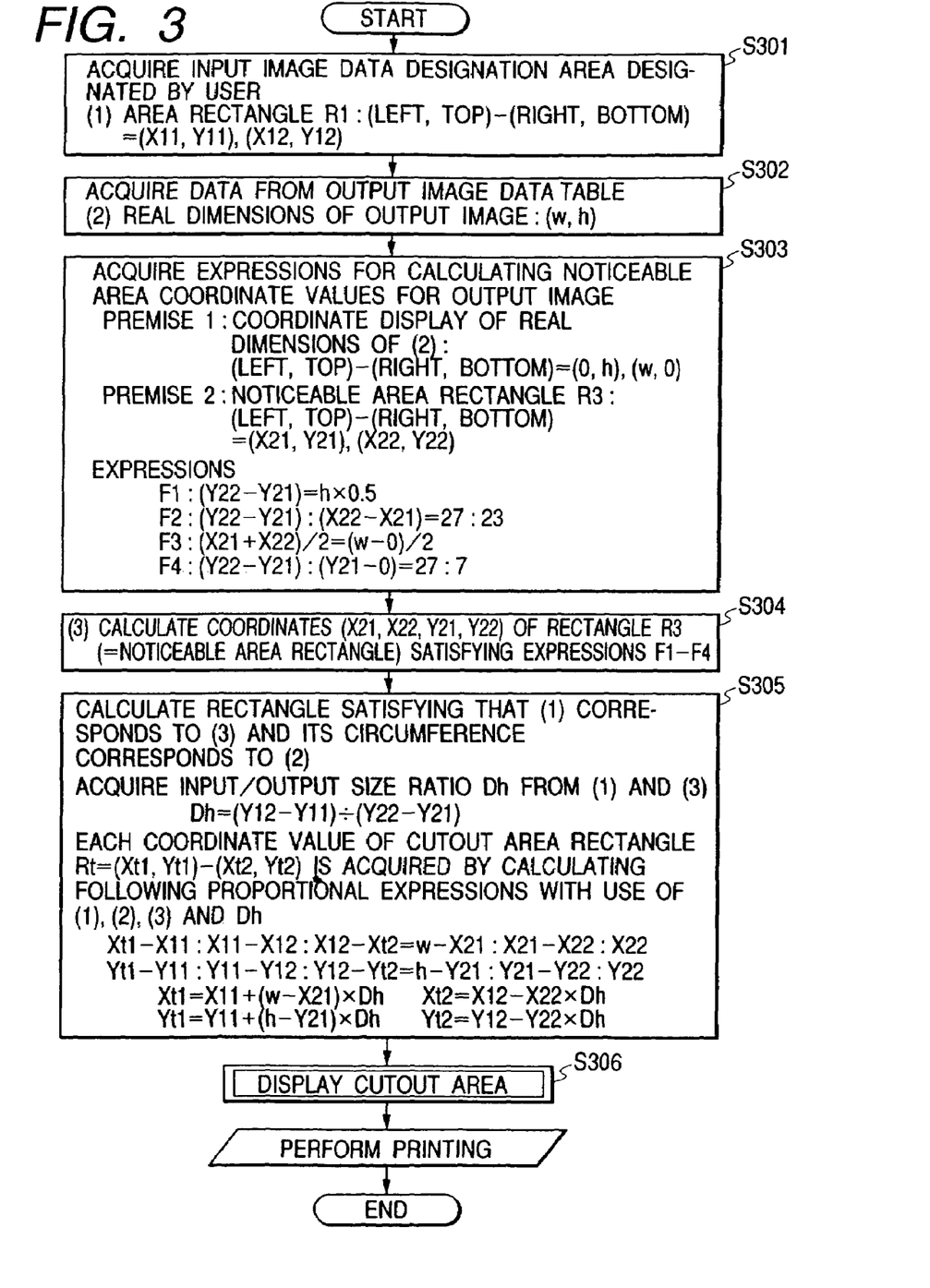
FIG. 3 is a flow chart showing an image processing method constituting a second embodiment.

FIG. 3 is a flow chart of the image processing method constituting the second embodiment of the present invention. Through the comparison of the control sequence shown in FIG. 3 with that shown in FIG. 2, it will be understood that the information of the noticeable rectangular area R2, acquired in the control sequence shown in FIG. 2 from the data table in the step S202, is obtained by calculations in two steps S303 and S304 in the flow shown in FIG. 3. In the following, therefore, there will be explained the control sequence of the present embodiment corresponding to the step S303 and S304, with reference to FIG. 3.

The CPU 1 acquires the calculating expressions for calculating the noticeable area in the output image, stored in the storage device 2. The system adopts the following four expressions which are common for the ordinary ID photograph (step S303):

F1) total size:face length=2:1
F2) face length:face width=27:23
F3) center of face width=center of width of ID photograph
F4) face length:distance between upper end of ID photograph and top of head=27:7

By substituting the coordinate values of the images shown in FIG. 5 into the expressions F1 to F4, there can be calculated the cutout rectangular area Rt defined by (Xt1, Yt1), (Xt2, Yt2) as shown in the left-hand half of FIG. 5 (step S304).

The present embodiment allows, in addition to the improvement in the operability that the concept of the necessary area in the ordinary life can be directly applied in designating the area on the input image data and the improvement in the process applicability that the arbitrary area designated by the operation means can be fitted in an arbitrary position by arbitrarily setting the coordinates of the noticeable area managed by the data table, to calculate the image cutout area solely from the actual height and width of the output image, thereby achieving further increase in the operation freedom and further improvement in the automated operation.

Third Embodiment

Figure 4:
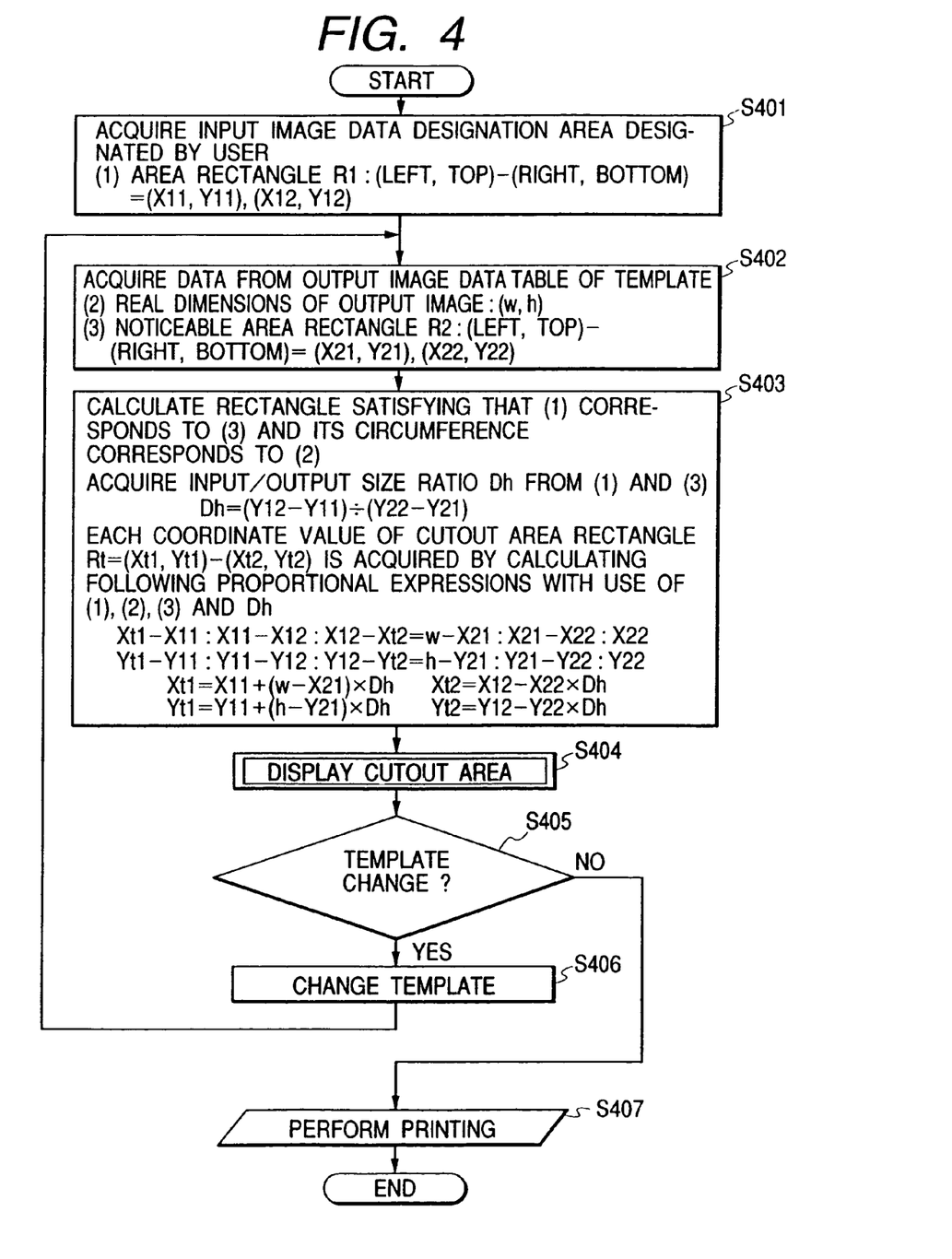
FIG. 4 is a flow chart showing an image processing method constituting a third embodiment.

FIG. 4 is a flow chart of the image processing method constituting the third embodiment of the present invention. Through the comparison of the control sequence shown in FIG. 4 with that shown in FIG. 2, it will be understood that a sequence, after the display of the cutout image, of receiving an event of change to a different template by the data table, then returning to the step S402 for acquiring the output image data of the new template and repeating the subsequent operations is added to the control sequence of FIG. 2.

The present embodiment achieves separation of the template data from the program codes thereby allowing to change the noticeable area of the output image without change in the program, and also improvement in the operability that plural output images can be displayed in continuous manner with the optimum image cutout area by only one designation of the arbitrary area on the input image data.

Fourth Embodiment

Figure 7:
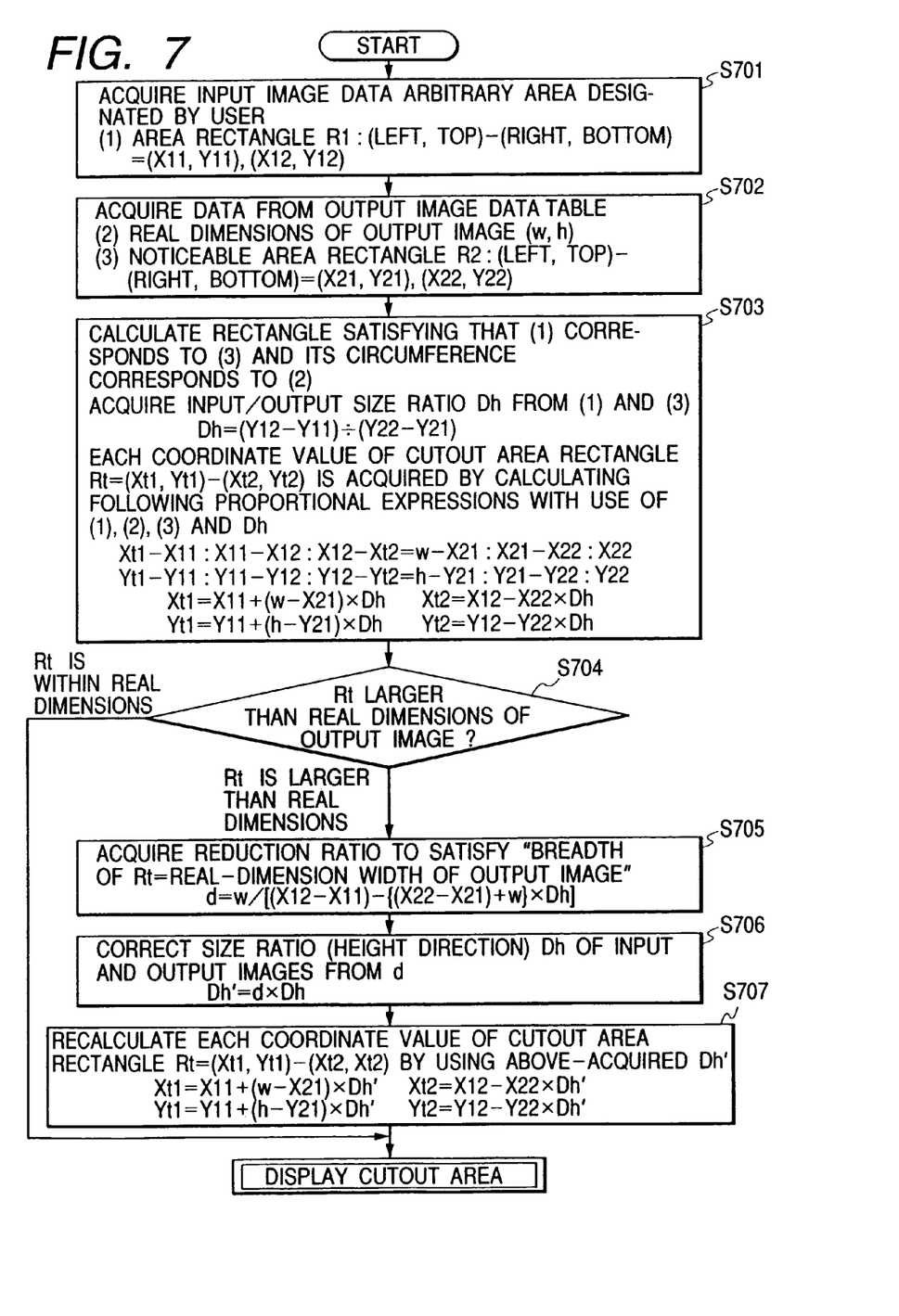
FIG. 7 is a flow chart showing an image processing method constituting a fourth embodiment.

FIG. 7 is a flow chart of the image processing method constituting the fourth embodiment of the present invention. Through the comparison of the control sequence shown in FIG. 7 with that shown in FIG. 2, it will be understood that steps S701, S702 and S703 in FIG. 7 are similar to those S201, S202 and S203 in FIG. 2 and that a sequence starting from a step S704 is added to the control sequence shown in FIG. 2. In the following, therefore, the sequence starting from the step S704 will be explained with reference to FIG. 7.

Figure 8A:
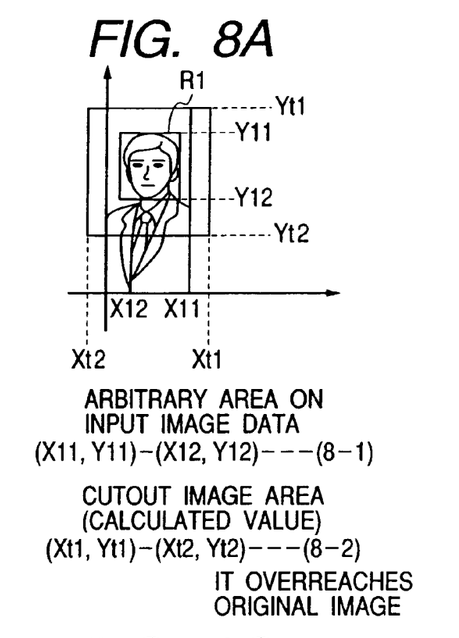
FIGS. 8A, 8B, 8C and 8D are views showing the input object image data and the output ID photograph image in the fourth embodiment.
Figure 8B:
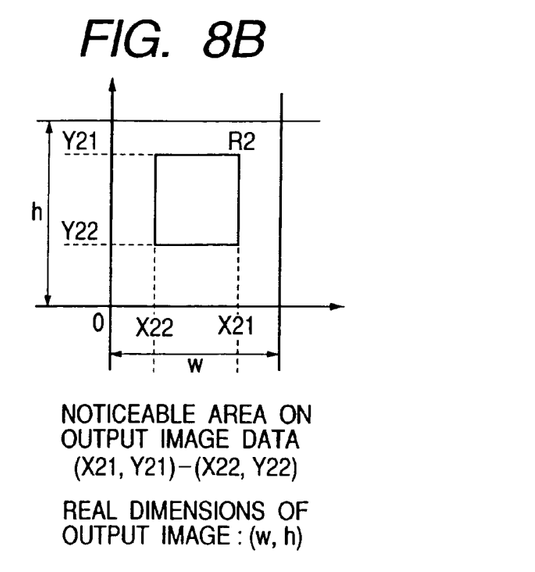

The cutout rectangular area Rt=(Xt1, Xt2), (Xt2, Yt2) calculated in the step S703 is the image cutout area required in fitting the face area R1 (X11, Y11)(X12, Y12) into the noticeable area R2 (X21, Y21)(X22, Y22) of the ID photograph of the actual size (w, h). However, Rt may overflow from the area of the output image as shown in FIG. 8A if the original image is too small. It is not desirable to cut out and display a portion where the image data are practically absent.

Therefore, the CPU 1 discriminates whether Rt, calculated in the step S703, is larger than the actual size of the image (step S704). As already explained in the step S203, the size ratio Dh between the input and the output is based on the vertical length, so that the vertical size of Rt calculated from such Dh can never be larger than the actual size of the image. Therefore, in the step S704, it is only necessary to compare the width of Rt with the actual width.

If the step S704 identifies that the width of Rt is within the actual width of the image, there are executed steps S705 to S707 and the CPU 1 displays the area Rt as the final result on the display device 5.

On the other hand, if the step S704 identifies that the width of Rt is larger than the actual width of the image, it is necessary to reduce the calculated value Rt of the image cutout area to the actual size Rt' of the image while maintaining the aspect ratio and the central coordinate of the area unchanged. Therefore the CPU 1 calculates a reduction ratio d, for reducing the width of Rt to the actual width of the image, according to the following expression (step S705):

$$d = w \div (Xt2 - Xt1)$$
$$= w \div [(X12 - X11) - \{(X22 - X21) + w\} \times Dh]$$

Then the image size ratio Dh between the input and the output is corrected with the value d calculated in the step S705 as follows (step S706):

$$Dh' = Dh \times d$$

Then the value Dh', obtained in the step S706, is used for calculating the actual value Rt'=(Xt1', Yt1'), (Xt2', Yt2') of the cutout area in the following manner (step S707):

$$Xt1' = X11 + (w - X21) \times Dh'$$

$$Yt1' = Y11 + (h - Y21) \times Dh'$$

$$Xt2' = X12 - X22 \times Dh'$$

$$Yt2' = Y12 - Y22 \times Dh'$$

Figures 8C, 8D:
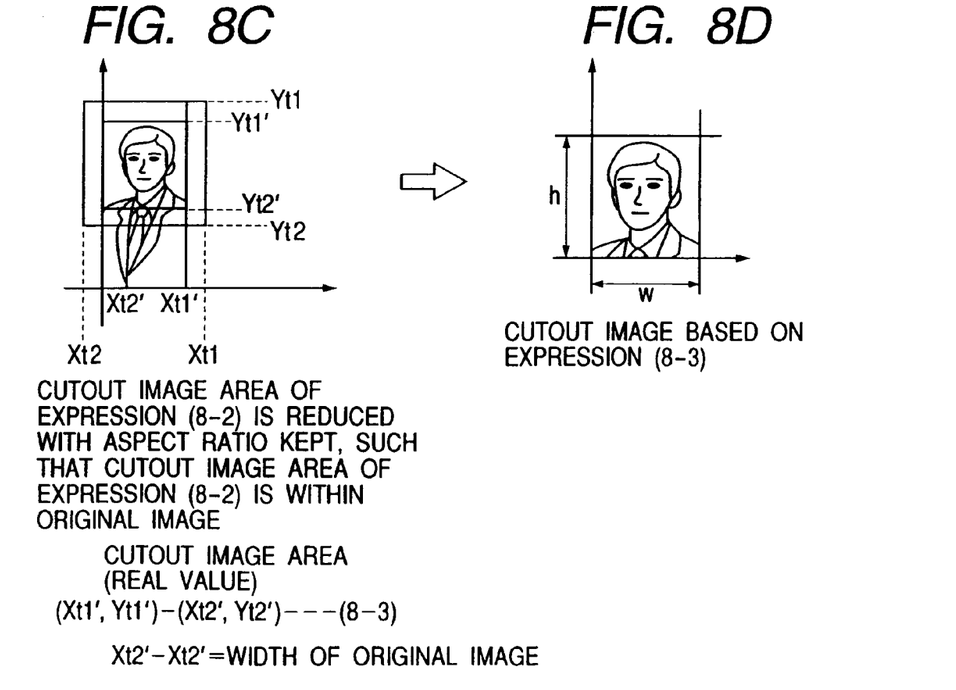

The CPU 1 displays the area Rt' as the final result on the display device 5, as shown in FIG. 8D. The face is displayed larger than the calculated value by the reduction ratio d, but there can be avoided the error of displaying the improper area outside the output image data.

When the display of the cutout image area Rt or Rt' is confirmed by the user, the CPU 1 causes the image output device to print the cutout image area. Through the above-described process, the system of the present embodiment can provide an ID photograph always utilizing the effective data.

Fifth Embodiment

Figure 9:
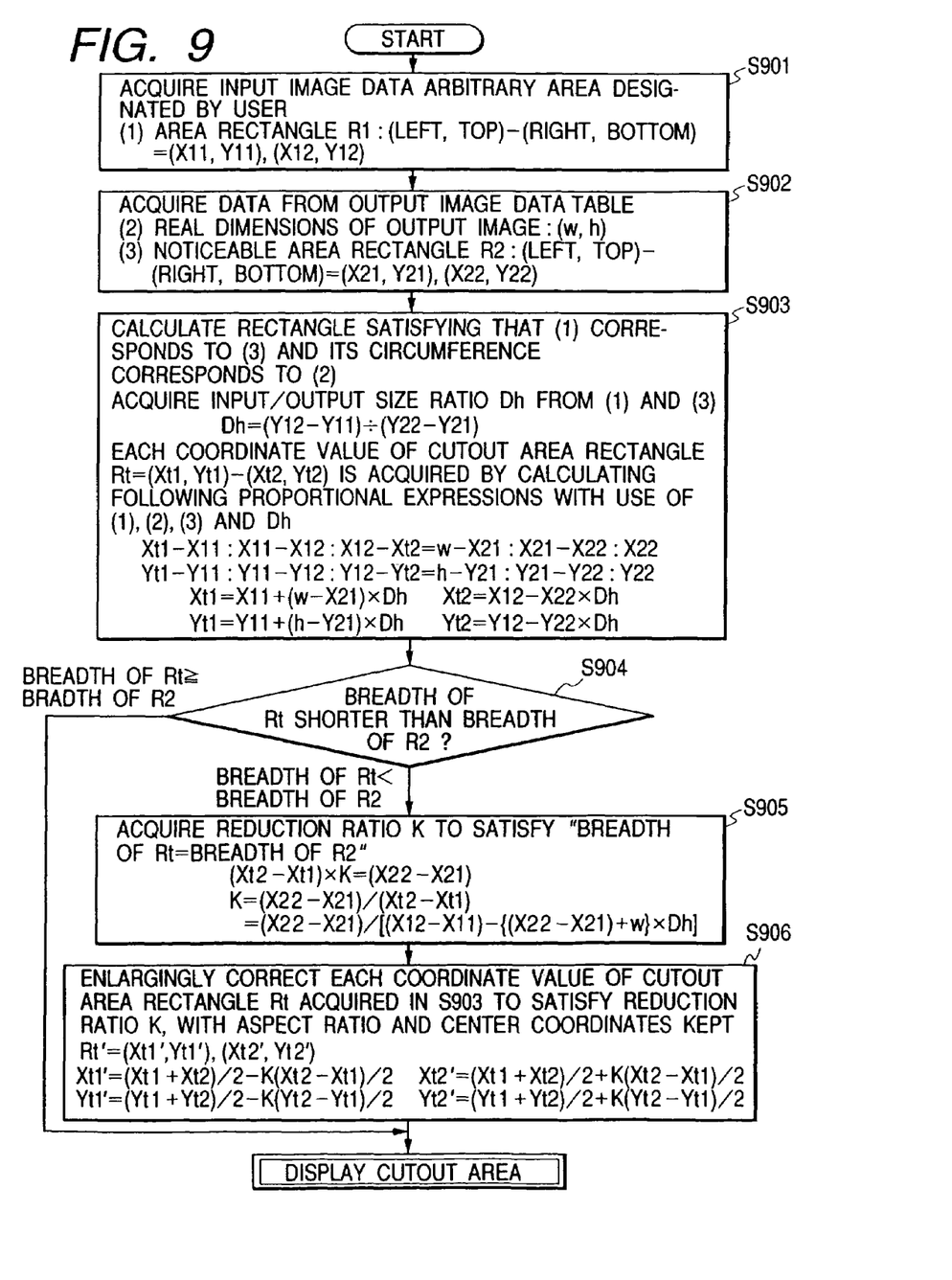
FIG. 9 is a flow chart showing an image processing method constituting a fifth embodiment.

FIG. 9 is a flow chart of the image processing method constituting the fifth embodiment of the present invention. Through the comparison of the control sequence shown in FIG. 9 with that shown in FIG. 2, it will be understood that steps S901, S902 and S903 in FIG. 9 are similar to those S201, S202 and S203 in FIG. 2 and that a sequence starting from a step S904 is added to the control sequence shown in FIG. 2. In the following, therefore, the sequence starting from the step S904 will be explained with reference to FIG. 9.

The cutout rectangular area Rt=(Xt1, Xt2), (Xt2, Yt2) calculated in the step S903 is the image cutout area required in fitting the face area R1 (X11, Y11)(X12, Y12) into the notice area R2 (X21, Y21)(X22, Y22) of the ID photograph of the actual size (w, h). However, such Rt may become improper if the cutout rectangle Rt is very oblong and the size thereof is close to the face size as shown in FIG. 10A.

Figure 10A:
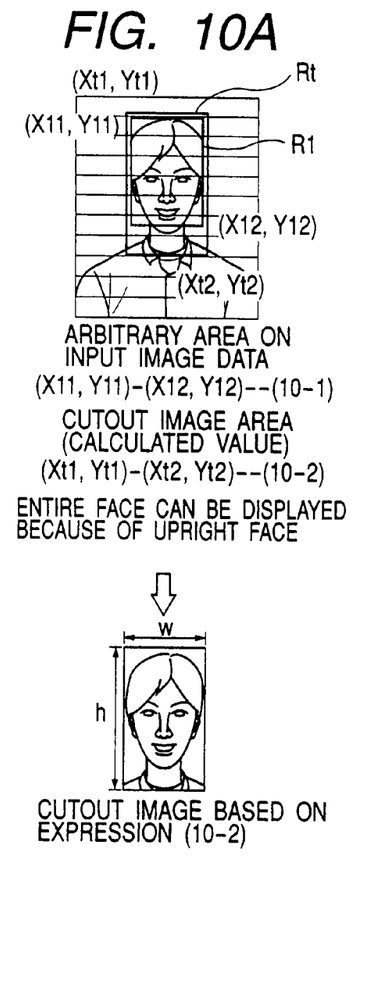
FIGS. 10A, 10B and 10C are views showing the input object image data and the output ID photograph image in the fifth embodiment.
Figure 10B:
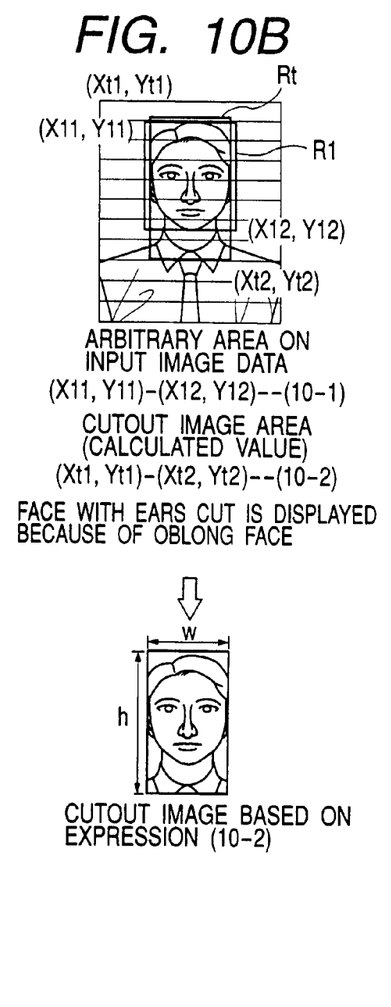

As an example, the input image size is same in FIGS. 10A and 10B, and the length of the face is also same. Consequently the image cutout area Rt, determined in the steps S901 to S903 based on the vertical size, becomes same in FIG. 10A and in FIG. 10B. As the face of the person shown in FIG. 10A is narrow, the face area R1 can all be accommodated in thus determined Rt. On the other hand, as the face of the person in FIG. 10B is wider, the face area R1 cannot be accommodated in thus determined Rt but the displayed image lacks the ears. Such image is undesirable for the ID photograph.

Therefore, the CPU 1 discriminates whether Rt, calculated in the step S903, is smaller than the corresponding area R2 (noticeable rectangular area) of the face area in the output (step S904). As already explained in the step S203, the size ratio Dh between the input and the output is based on the vertical length, so that the vertical size of Rt calculated from such Dh can never be smaller than the noticeable area. Therefore, in the step S904, it is only necessary to compare the width of Rt with the width of the noticeable area.

If the step S904 identifies that the width of Rt is at least equal to the width of the noticeable area, there are executed steps S905 and S906 and the CPU 1 displays the area Rt on the display device 5.

Figure 10C:
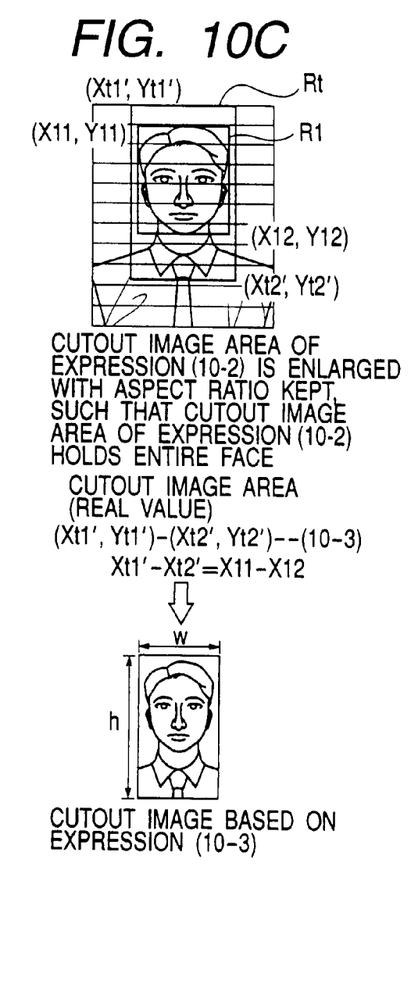

On the other hand, if the step S904 identifies that the width of Rt is smaller than the width of the noticeable area, it is necessary to enlarge the calculated value Rt of the image cutout area to the actual size Rt' of the image while maintaining the aspect ratio and the central coordinate of the area unchanged, as shown in FIG. 10C. Therefore the CPU 1 calculates a reduction ratio K, for bringing the width of Rt to the actual width of the noticeable area R2, according to the following expression (step S905):

$$K = (X22 - X21) \div (Xt2 - Xt1)$$
$$= (X22 - X21) \div [(X12 - X11) - \{(X22 - X21) + w\} \times Dh]$$

Then the coordinate values of Rt of the previously determined cutout area is corrected by enlargement with the ratio K determined in the step S905, while the center of the image and the aspect ratio are maintained (step S906), in the following manner:

Actual value Rt' of the cutout area:

$$Rt'=(Xt1', Yt1'), (Xt2', Yt2')$$

Central coordinate of Rt':

$$C=(Cx, Cy)=((Xt1+Xt2)/2, (Yt1+Yt2)/2)$$

Size of Rt':

$$S=(Sx, Sy)=((Xt2-Xt1)\times K, (Yt2-Yt1)\times K)$$

$$Xt1'=Cx-Sx/2$$

$$Yt1'=Cy-Sy/2$$

$$Xt2'=Cx+Sx/2$$

$$Yt2'=Cy+Sy/2$$

The CPU 1 displays the area Rt' on the display device 5. The image is displayed in a range indicated as "cutout image based on expression 10-3" in FIG. 10C. The face is displayed smaller than the calculated value by the ratio K, but there can be avoided the error such as partial lack of the face, as indicated by "cutout image based on expression 10-2" in FIG. 10B.

When the display of the cutout image area Rt or Rt' is confirmed by the user, the CPU 1 causes the image output device to print the cutout image area. Through the above-described process, the system of the present embodiment can provide an ID photograph always utilizing the effective data.

Sixth Embodiment

The foregoing fourth and fifth embodiments have been described separately, but the system may be so constructed as to execute double checking for achieving the two functions of these embodiments (for maintaining the cutout rectangular area Rt at least equal to the noticeable area R2 and accommodating it within the actual image area).

In the fourth to sixth embodiments, the system automatically identifies that the cutout rectangular area Rt determined in the initial calculation is inadequate and executes the display with the appropriately corrected Rt', but the system may also be so modified as to display an alarm message when the inadequate cutout area is identified and to cause the user to change the input image or to re-designate the face area. The system may be further so modified that the user can select, in case such alarm message is displayed, whether the process is continued according to the automatic correction of the system or the process is repeated from the beginning by the change of the input image or by the re-designation of the face area by the user. However, the present invention is not limited by the content of such alarm message or by the method of displaying such alarm message. Similarly the present invention is not limited by the alarm method or alarm message for causing the user to change the input image or to re-designate the face area, or the process sequence for entering such process, and the present invention is likewise effectively applicable to any of these modifications.

Other Embodiments

The values of the ratios in the proportional expressions F1 to F4 employed in the second embodiment for explaining the example shown in FIG. 3 are not restrictive and may be changed according to the purpose. Also the values of such proportional expressions or the expressions themselves may be not fixed within the program but may be made arbitrarily modifiable by the user through the GUI. For example, automatic image fitting with higher precision may be realized by selecting the length-width ratio of the face according to the face or sex of the object image, utilizing a fact that such length-width ratio of the face contour depends on the human race and the sex.

Also there may be provided means for fine adjustment of the acquired cutout area. Such means can be realized by the trimming function available in most image editing apparatus.

Also the noticeable area on the input image data may be held as data associated with the input image. More specifically, based on a fact that the object image taken as the ID photograph in an ID photographing apparatus or in a photo studio is prepared in consideration of the size and position of the face at the photo taking stage, it is intended to execute the image fitting process by skipping an operation by the user, assuming that the noticeable area is already set in a predetermined location of the input image. Thus the system of the present invention may further be modified in such a manner as to have the noticeable area, specific to each ID photograph preparation system or each photo taking system of the photo studio, as a database and to realize optimum face fitting through automatic reading of the data of the noticeable area, by entering "photo taking path" at the image entry. However the configuration of the ID photograph preparation system is not restrictive, and the photo taking may be achieved by any photo taking apparatus or any camera.

In the foregoing embodiments, there has been assumed a configuration in which the CPU 1 reads and executes a computer program stored in the program storage device 8, but the hardware configuration shown in FIG. 1 need not necessarily be constructed by the devices exclusive to the foregoing embodiments and may be constructed with a personal computer of general use.

Thus the foregoing embodiments allow to obtain an appropriate cutout area with simple operations.

The present invention has been explained by certain preferred embodiments. However the present invention is by no means limited to such embodiments but is naturally subject to various modifications and applications within the scope and spirit of the appended claims.

What is claimed is:

1. An image processing method, by which a cut-out area having a face area is processed from an original image including a human face, comprising:

using an image processing apparatus to perform the steps of;

a designation step of designating a rectangle that encloses the face area on the original image, the rectangle being smaller than the cut-out area;

an alarm display step of displaying an alarm message in a case where it is discriminated that the cut-out area is larger in at least one dimension than the original image;

a selection step of allowing a user to select either one of first and second modes in the displayed alarm message;

a calculation step of calculating a reduction ratio so that an area of expression of the cut-out area is included in the original image and so that the designated rectangle is fitted into a noticeable area corresponding to the face area on output image data, if the first mode is selected by the user in the displayed alarm message;

a correction step of executing a reduction correction to the cut-out area based on the calculated reduction ratio, while maintaining an aspect ratio of the cut-out area, if the first mode is selected by the user in the displayed alarm message; and a redoing step of allowing the user to change the original image or to re-designate the rectangle that encloses the face area in the designation step, if the second mode is selected by the user in the displayed alarm message.

2. An image processing method according to claim 1, wherein the reduction ratio is calculated so that the horizontal width of the cut-out area becomes equal to the horizontal width of the output image data.

3. An image processing apparatus which cuts out a cut-out area having a face area from an original image including a human face, comprising:

a designation unit adapted to designate a rectangle that encloses the face area on the original image, the rectangle being smaller than the cut-out area;

an alarm display unit of displaying an alarm message in a case where it is discriminated that the cut-out area is larger in at least one dimension than the original image;

a selection unit of allowing a user to select either one of first and second modes in the displayed alarm message;

a calculation unit to calculate a reduction ratio so that an area of expression of the cut-out area is included in the original image and so that the designated rectangle is fitted into a noticeable area corresponding to the face area on output image data if the first mode is selected by the user in the displayed alarm message and;

a correction unit adapted to execute a reduction correction to the cut-out area based on the calculated reduction ratio, while maintaining an aspect ratio of the cut-out area if the first mode is selected by the user in the displayed alarm message; and a redoing unit of allowing the user to change the original image or to re-designate the rectangle that encloses the face area in the designation unit, if the second mode is selected by the user in the displayed alarm message.

4. An image processing apparatus according to claim 3, wherein the reduction ratio is calculated so that the horizontal width of the cut-out area becomes equal to the horizontal width of the output image data.

5. A storage medium which computer-readably stores a program for causing a computer to execute an image processing method by which a cut-out area having a face area is processed from an original image including a human face, said method comprising:

a designation method of designating a rectangle that encloses the face area on the original image, the rectangle being smaller than the cut-out area;

an alarm display method of displaying an alarm message in a case where it is discriminated that the cut-out area is larger in at least one dimension than the original image;

a selection method of allowing a user to select either one of first and second modes in the displayed alarm message;

a calculation method calculating a reduction ratio so that an area of expression of the cut-out area is included in the original image and so that the designated rectangle is fitted into a noticeable area corresponding to the face area on output image data if the first mode is selected by the user in the displayed alarm message;

a correction method of executing a reduction correction to the cut-out area based on the calculated reduction ratio, while maintaining an aspect ratio of the cut-out area if the first mode is selected by the user in the displayed alarm message; and, a redoing method of allowing the user to change the original image or to re-designate the rectangle that encloses the face area in the designation method, if the second mode is selected by the user in the displayed alarm message.

* * * * *